Dec. 23, 1952     H. L. CORBET ET AL     2,622,590
STEAM JACKETED RENDERING KETTLE WITH BOTTOM DRAWOFF
Filed Aug. 6, 1947
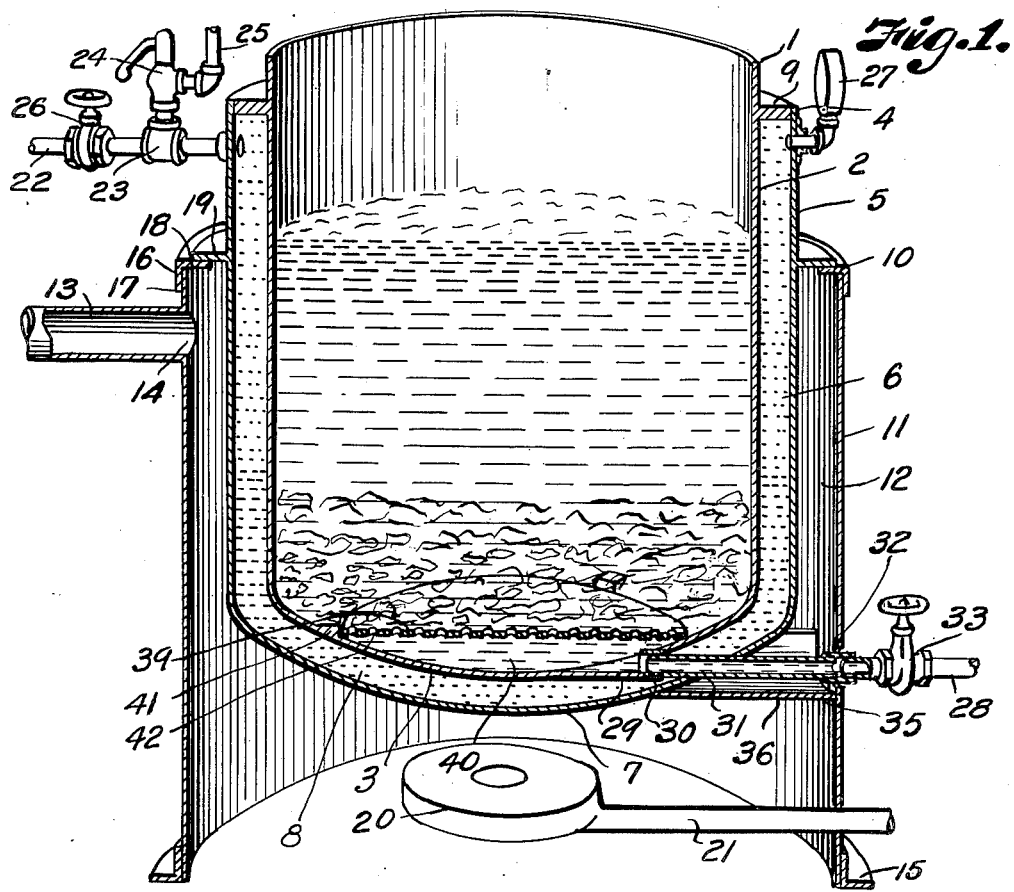
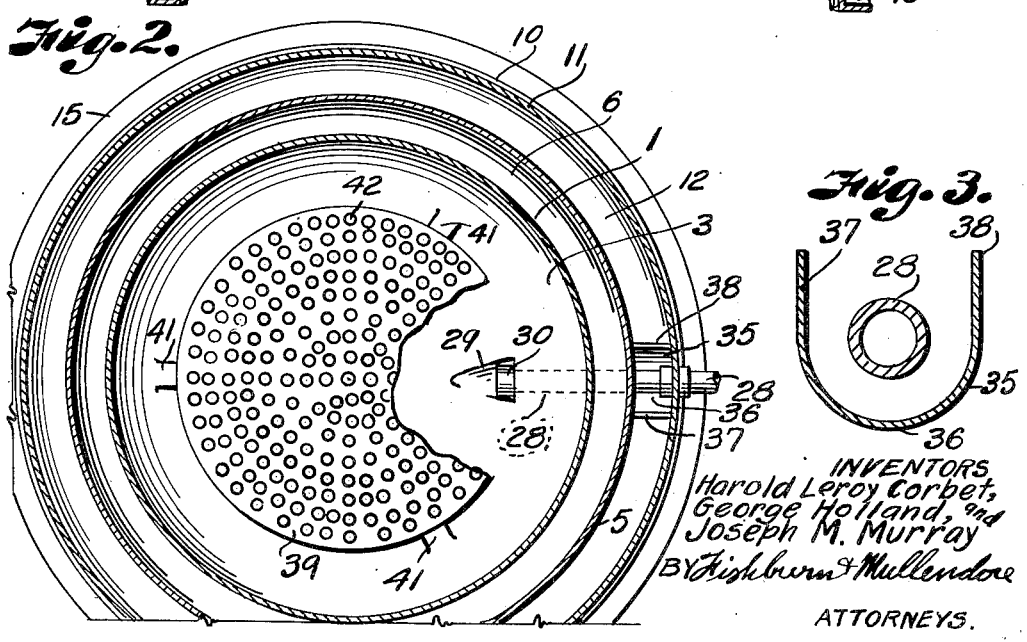
INVENTORS
Harold Leroy Corbet,
George Holland, and
Joseph M. Murray
BY Fishburn & Mullendore
ATTORNEYS.

Patented Dec. 23, 1952

2,622,590

UNITED STATES PATENT OFFICE 2,622,590

STEAM JACKETED RENDERING KETTLE WITH BOTTOM DRAWOFF

Harold Leroy Corbet and George Holland, Dayton, Ohio, and Joseph M. Murray, Kansas City, Mo., assignors, by mesne assignments, to Raymond H. Starr, Kansas City, Mo.

Application August 6, 1947, Serial No. 766,608

3 Claims. (Cl. 126—378)

This invention relates to steam jacketed rendering kettles such as used in rendering lard and similar products that must be kept below a certain maximum temperature to prevent burning or scorching of the product. For example, lard is rendered within a kettle having its bottom and sides supported within a firebox and enclosed within a steam jacket for preventing the contact of the fire with the vessel. In this way the temperature of the material within the vessel is readily controlled by maintaining a predetermined steam pressure.

Prior to the present invention it has been the practice to pump or laddle the material from the vessel for the reason that bottom drawoffs have not been satisfactory. This is readily apparent when it is recognized that the drawoff must extend through the direct heat of the firebox and consequently the material within the drawoff would become scorched and contaminate the entire batch of material within the kettle.

It is, therefore, the principal object of the present invention to provide a bottom drawoff duct for rendering kettles of this character through which material can be drained without overheating or scorching.

It is also an object of the invention to provide the kettle with means for supporting the cracklings above the bottom of the kettle and out of the drawoff duct so that the cracklings do not cause overheating of the bottom of the kettle or interfere with drawoff of the melted lard.

In accomplishing these and other objects of the invention hereinafter pointed out, we have provided improved structure, the preferred form of which is illustrated in the accompanying drawings wherein:

Fig. 1 is a vertical sectional perspective view of a rendering kettle equipped with a drawoff and bottom screen constructed in accordance with the present invention.

Fig. 2 is a horizontal section through the rendering kettle, particularly illustrating the bottom screen and the drawoff connection with the bottom of the kettle.

Fig. 3 is an enlarged section through the drawoff duct and its heat protecting guard.

Referring more in detail to the drawings:

1 designates a rendering kettle having an annular wall 2 and a substantially concave bottom 3 forming a container for the fat or other material to be rendered or processed. The kettle is enclosed in a jacket 4 having a circumferential wall 5 spaced from the wall 2 of the kettle to form an annular passageway 6 therebetween. The wall 5 of the jacket extends below the kettle and carries a bottom 7 (Fig. 1) that is spaced from the bottom 3 of the kettle to provide a passageway 8. The passageways 6 and 8 thus cooperate to completely surround the kettle. The upper end of the passageway 6 is closed by a ring 9 that encircles the wall of the kettle and is connected therewith and to the wall of the jacket as by welding to provide steam-tight joints.

The unit just described is suspended within a firebox 10 having an annular wall 11 spaced from the wall 5 of the jacket to provide an annular passageway 12 for products of combustion moving to a flue duct 13 that is connected with the passageway 12 through an opening 14 in the wall 11. The bottom of the firebox wall has a footing flange 15 on which it is supported. The upper end of the wall carries a ring 16 having a depending flange 17 sleeved thereover and an inwardly extending flange 18 that seats an outwardly extending annular flange 19 projecting from the wall 5 of the jacket. The jacketed kettle is thus supported with the major portion thereof suspended within the firebox with the exterior of the jacket in direct contact with the products of combustion and the flame from a burner 20 that is supplied with fuel through a duct 21, the duct extending through the wall of the firebox and being suitably connected with the burner.

In the illustrated instance the water is supplied to the upper portion of the steam passageway through a pipe 22 having a T 23 to which is connected a pressure control valve 24 which is adapted to discharge excess pressure to atmosphere through a pipe 25. Flow of water to the jacket is regulated by a valve 26 that is connected into the pipe ahead of the T 23.

The jacket of the kettle is also provided with a steam gauge 27 for indicating the pressure of the steam therein and which may be regulated by adjusting the pressure control valve as will be readily understood.

The structure thus far described is conventional of a standard rendering kettle and operates very satisfactorily to render out the lard without danger of overheating but the disadvantage is that the rendering lard must be removed by pump or ladles through the open top of the kettle. To avoid this difficulty, the kettle of the present invention is provided with a bottom drawoff 28 through which the material is adapted to be discharged by gravity, thereby avoiding the hazards of ladling out the material or the expense of a pumping mechanism.

The bottom drawoff includes a depression 29 that is provided in the bottom of the kettle and into which is welded a nipple 30 for connection of the drawoff duct or pipe 28. The duct 28 leads through openings 31 and 32 in the jacket 4 and wall 11 of the firebox respectively. A shutoff valve 33 is connected into the duct at a point exteriorly of the firebox. The depression 29 is formed to provide a lateral connection of the drawoff duct 28 so that the lower portion of the inlet to the duct is at the bottom of the kettle to assure complete drainage therefrom.

In order to prevent the flame in the firebox and direct heat from contacting the portion of the drawoff duct extending across the passageway 12, this portion of the duct extends through a trough-like protector or guard 35 that has a rounding bottom 36 of larger diameter than the drawoff pipe and extending thereunder as best shown in Fig. 3. The sides 37 and 38 of the rounded bottom extend a substantial distance above the duct to assure that the heat and products are guided therearound. The guard may be constructed of sheet metal that is properly shaped at the ends to correspond with the bottom of the jacket 4 and wall 11 of the firebox 10 respectively and to which the ends are adapted to be connected as, for example, by welding. The drawoff duct is also suitably welded to the jacket of the kettle to prevent leakage of the water.

In providing the bottom drawoff, it is necessary to equip the bottom of the kettle with a plate or screen 39 having suitable diameter so that the marginal edge thereof is supported at a high enough point on the bottom 3 to provide a drainage space 40 leading to the inlet of the drawoff duct 28. The plate is retained in centered position by means of lugs 41 that are welded to the bottom 3 and which project upwardly a sufficient distance to engage the rim of the plate. The plate is provided with a plurality of openings 42 that are of sufficiently small diameter to prevent passage of cracklings into the space 40. It is thus obvious that the cracklings are supported above the bottom so that they cannot enter the drawoff pipe to interfere with draining off the melted lard or effecting the temperature of the melted lard directly on the bottom of the kettle or in the drawoff pipe.

In operating the kettle, water is admitted into the jacket upon opening of the valve 26 and the burner 20 is started to raise the temperature of the water to the temperature to which the generated steam operates the pressure relief valve 24. The fat to be rendered is inserted into the kettle and the temperature thereof is automatically maintained below a predetermined maximum by the temperature of the water and steam carried within the jacket surrounding the kettle. The space 40 and drawoff duct 28 will, of course, fill with melted material but the material cannot be heated to the scorching point by reason of the protector 35 which is under and at the sides of the portion of the duct 28 extending through the firebox. The opening 32 may be somewhat larger than the duct 28 to provide for infiltration of atmospheric air which carries off any heat conducted through the protector sleeve 35. Cracklings may be dipped out of the kettle by means of a suitable strainer (not shown) and placed in a press to obtain the grease therein, after which the grease is returned to the kettle. The melted material may then be withdrawn from the kettle by opening the valve 33 and allowing the material to drain by gravity through the drawoff duct 28.

From the foregoing it is obvious that we have provided a rendering kettle with a bottom drawoff of simple and inexpensive construction and which is insulated or protected from direct heat of the firebox to prevent scorching or damage to the material being rendered.

It is also obvious that the screen keeps the cracklings off the bottom of the kettle and out of the drawoff duct so that the duct is always open for discharge of the melted material.

What we claim and desire to secure by Letters Patent is:

1. An apparatus of the character described including a firebox having a wall provided with an opening, a kettle having a bottom portion supported within the firebox, a jacket covering said bottom portion of the kettle and spaced therefrom to provide a passageway for a fluid medium adapted for transmitting heat to the kettle, a drawoff duct connected with the kettle and extending through the jacket and passing through the opening in the wall of the firebox, said opening being adapted to provide an air inlet therearound, and a heat protecting guard extending under and around sides of the drawoff duct and having an end connected with the wall of the firebox at said opening and an end connected with the jacket for forming a passageway for exterior air admitted through said inlet opening, said heat protecting guard having an open top providing an outlet for said air by way of the firebox.

2. An apparatus of the character described including a firebox having a wall provided with an opening, a kettle having a bottom portion supported within the firebox, and having a depression provided with a lateral outlet opening, a jacket covering said bottom portion of the kettle and spaced therefrom to provide a passageway for a fluid medium adapted for transmitting heat to the kettle, a drawoff duct connected with the outlet opening of the sump and extending through the jacket and passing through the opening in the wall of the firebox, the latter opening being of larger diameter than the duct to provide an air inlet therearound, an open top guard extending under and above the sides of the duct and having an end connected with the wall of the firebox at said opening and an end connected with the jacket for protecting the duct from direct heat of the firebox and for forming a passageway for exterior air admitted through said opening.

3. An apparatus of the character described including a firebox having a wall provided with an opening, a kettle having a bottom portion supported within the firebox, and having a depression provided with a lateral outlet opening, a jacket covering said bottom portion of the kettle and spaced therefrom to provide a passageway for a fluid medium adapted for transmitting heat to the kettle, a drawoff duct connected with the outlet opening of the sump and extending through the jacket and passing through the opening in the wall of the firebox, latter opening being of larger diameter than the duct to provide an air inlet therearound, an open top guard extending under and above the sides of the duct and having an end connected with the wall of the firebox at said opening and an end connected with the jacket for protecting the duct from direct heat of the firebox and for forming a passageway for exterior air admitted through said opening, and a perforated guard supported in the kettle above said outlet to prevent solid material from entering the drawoff duct.

HAROLD LEROY CORBET.
GEORGE HOLLAND.
JOSEPH M. MURRAY.

REFERENCES CITED

The following references are of record in the file of this patent:

UNITED STATES PATENTS

| Number | Name | Date |
|--------|------|------|
| 287,424 | Dopp | Oct. 30, 1883 |
| 486,881 | Miller | Nov. 29, 1892 |
| 534,566 | Miller | Feb. 19, 1895 |
| 754,135 | Grubitz | Mar. 8, 1904 |
| 798,498 | Dickson | Aug. 29, 1905 |
| 1,376,852 | Andresen | May 3, 1921 |
| 1,494,979 | Salisbury | May 20, 1924 |
| 1,499,852 | Cerini | July 1, 1924 |
| 2,326,420 | Vukasinovich | Aug. 10, 1943 |

FOREIGN PATENTS

| Number | Country | Date |
|--------|---------|------|
| 449,352 | Great Britain | June 25, 1936 |